(12) United States Patent
Bruhnke et al.

(10) Patent No.: US 6,616,205 B2
(45) Date of Patent: Sep. 9, 2003

(54) CENTRAL CONSOLE IN A MOTOR VEHICLE INTERIOR

(75) Inventors: Ulrich Bruhnke, Ehningen (DE); Santiago Dueñas, Ammerbuch (DE); Christoph Jonischkeit, Grafing (DE); Michael Kelz, Aidlingen (DE); Van-Hung Nguyen, Sindelfingen (DE); Tilo Volkmann, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/898,443

(22) Filed: Jul. 5, 2001

(65) Prior Publication Data

US 2003/0047955 A1 Mar. 13, 2003

(30) Foreign Application Priority Data

Jul. 5, 2000 (DE) .......................... 100 32 661

(51) Int. Cl.7 ................................. B60R 7/00
(52) U.S. Cl. ...................... 296/37.8; 224/275
(58) Field of Search ................ 296/24.1, 37.8, 296/37.5, 37.16, 37.1; 224/929, 400, 401, 275

(56) References Cited

U.S. PATENT DOCUMENTS 5,397,160 A * 3/1995 Landry ................ 296/37.8
5,556,017 A * 9/1996 Troy .................... 224/929
5,836,496 A * 11/1998 Levin et al. ............ 296/37.8
5,996,866 A * 12/1999 Susko et al. ........... 296/37.8

FOREIGN PATENT DOCUMENTS

DE 19724597 11/1998

* cited by examiner

Primary Examiner—Joseph D. Pape
Assistant Examiner—Lori L Coletta
(74) Attorney, Agent, or Firm—Crowell & Moring LLP

(57) ABSTRACT

A central console for a motor vehicle interior has a lower stowage compartment which can be closed by a lid module and is bounded laterally by side walls. The lid module can be pivoted about a pivot axis which is arranged at its rear end and runs in the transverse direction of the vehicle. An upper stowage compartment is arranged on the lower side of the lid module for accommodating a telephone device or other items and is covered by a first lid forming part of an armrest. A further upper stowage space is covered by a second lid which is designed as a further part of the armrest and can be pivoted about a pivot axis. The further upper stowage space is designed as part of the upper stowage compartment and together with the second lid is assigned to the lid module in such a manner that they can be pivoted together with the lid module.

23 Claims, 10 Drawing Sheets

CENTRAL CONSOLE IN A MOTOR VEHICLE INTERIOR

BACKGROUND AND SUMMARY OF THE INVENTION

This application claims the priority of German application 100 32 661.7, filed Jul. 5, 2000, the disclosure of which is expressly incorporated by reference herein.

The invention relates to a central console in a motor vehicle interior. Preferred embodiments relate to such a central console having a lower stowage compartment which can be closed by a lid module and is bounded laterally by side walls, in which case the lid module can be pivoted about a pivot axis which is arranged at its rear end and runs in the transverse direction of the vehicle, having an upper stowage compartment which is arranged on the lower side of the lid module, accommodates a telephone device or other items and is covered by a first lid forming part of an armrest, and having a further upper stowage space which is covered by a second lid which is designed as a further part of the armrest and can be pivoted about a pivot axis.

A central console of this type which is used in the Mercedes-Benz S Class (W220) and is disclosed in large part in German Patent Document DE 197 24 597 C1 comprises a lower stowage compartment which can be closed by an L-shaped lid module. The lid module can be pivoted about a pivot axis which runs in the transverse direction of the vehicle and is arranged at its rear end. Provided on the lower side of the lid module is an upper stowage compartment which is covered by the first lid forming part of an arm rest and in which a telephone is held. In order to permit access to the telephone, this lid can be pivoted between a closed position and an open position about a pivot axis which runs in the transverse direction of the vehicle and is arranged at its rear end. In addition to the upper stowage compartment which is assigned to the lid module a further upper stowage space for accommodating a cup-holder device is provided, the stowage space being assigned a second lid which is designed as a further part of the armrest. This second lid can be pivoted between the closed position and the open position about a pivot axis running in the longitudinal direction of the vehicle, so that the cup-holder device is accessible.

An object of the invention is the provision of a central console of the type mentioned at the beginning in which while the easy accessibility of the upper stowage compartment for front and rear passengers is retained, even better use can generally be made of the upper stowage compartment for the rear passengers and the lower stowage compartment.

According to the invention, this object is achieved by a central console of the above noted type wherein the further upper stowage space is designed as part of the upper stowage compartment and together with the second lid is assigned to the lid module in such a manner that they can be pivoted together with the lid module. Other advantageous features of preferred embodiments are set forth herein and in the claims.

This integration of the further stowage space into the upper stowage compartment means that the latter is also available to the rear passengers, particularly with the lid module pivoted rearwards. In this arrangement, the stowage space which is added to the upper stowage compartment can be partitioned off and can be used separately for accommodating relatively small items, such as sunglasses or the like, or can contribute to enlarging the upper stowage compartment in order, for example, to be able to accommodate the telephone device in a less confined and more convenient manner. Since the stowage space can be pivoted together with the lid module into the open position, which affords access to the lower stowage compartment, it is possible, in addition, to configure the opening cross section of the lower stowage compartment to be larger. By this means, the lower stowage compartment can be used for relatively large and bulky objects and is more easily accessible in particular for the front passengers of the motor vehicle.

The accommodating of the telephone device within the further upper stowage space which is partitioned off by the upper stowage compartment affords the advantage of a separate storage option, in which case only the second lid assigned to the upper storage compartment has to be opened in order to use the telephone device.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
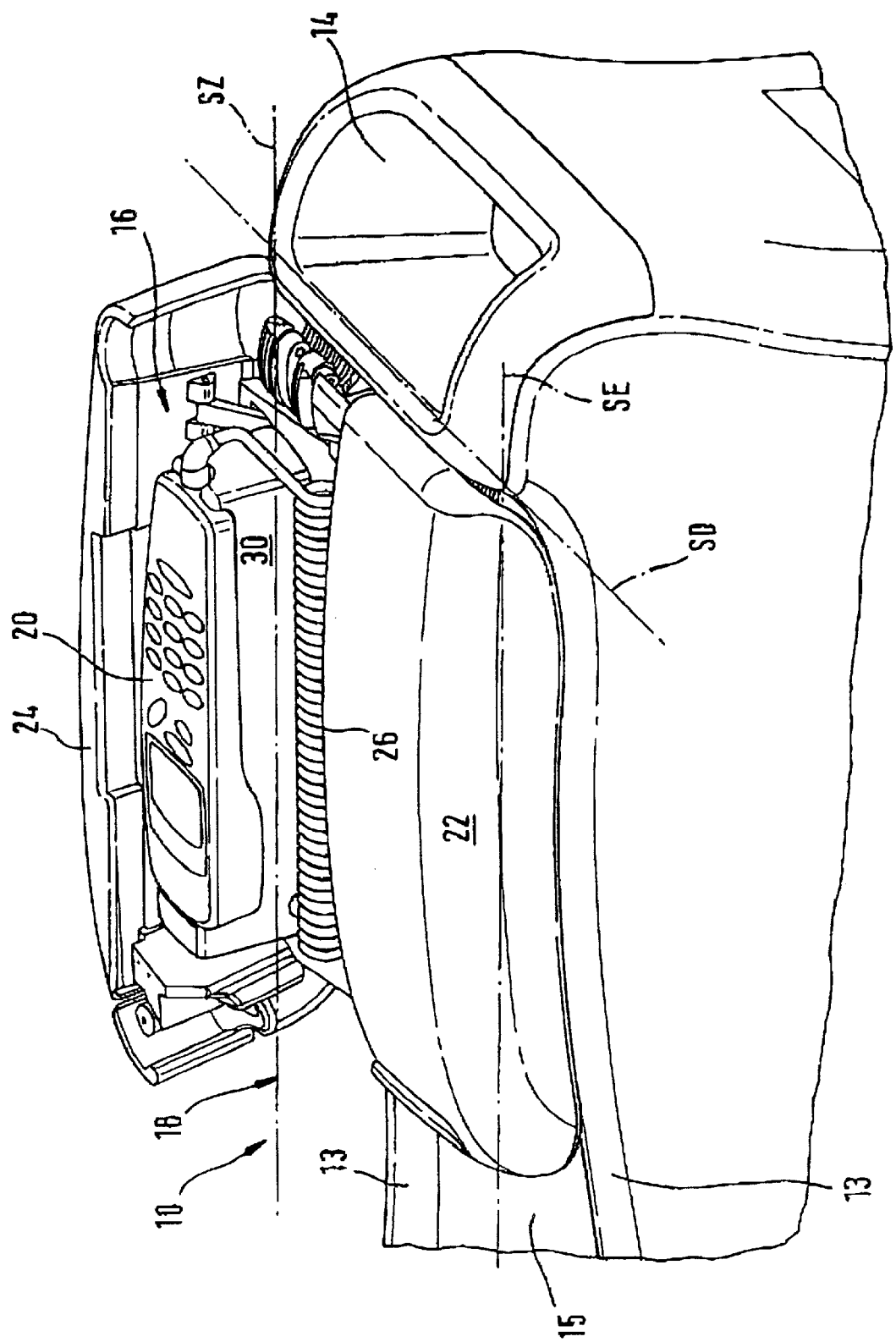
FIG. 1 shows a lateral perspective view of a central console according to the invention according to a first embodiment of the invention, in which the second lid which is assigned to a further, upper stowage space has been opened in order to gain access to a telephone device.

FIG. 1 shows, in a partial perspective view laterally and obliquely from the rear, a central console according to a first embodiment between front seats (not illustrated) in a motor vehicle interior. The central console comprises a lid module 10 which can be seen in particular in FIG. 3 and with which a lower stowage compartment 12, 12' (FIG. 3, FIG. 9) which is situated in the central region of the central console can be closed. Provided in a rear region of the central console, as seen in the longitudinal direction of the vehicle, is, for example, a pigeon-hole 14 or a control and air-outlet device (not illustrated here) for a rear air-conditioning system. A facing 15 which extends approximately horizontally between vertical side walls 13 of the central console is arranged in front of the stowage compartment 12, which is closed by the lid module 10.

A telephone device 20 is accommodated in an upper stowage space 16, which is assigned to an upper stowage compartment 18 provided on the lower side of the lid module 10. The upper stowage compartment 18 is covered by a first lid 22, arranged on the left here, and by a second lid 24, which is arranged on the right, is assigned to the upper stowage space 16 and has been opened in FIG. 1 in order to gain access to the telephone device 20 for the front passengers. In other words, the lid module 10 is shown here in its closed position closing the lower stowage compartment 12 and the second lid 24 is shown in its open position, so that the telephone device 20 is accessible in a simple manner for the front passengers of the motor vehicle.

The two lids 22, 24 are each mounted pivotably on the lid module 10, in which case the pivot axis SE of the first lid 22 runs in the longitudinal direction of the vehicle and on the left on the outside and the pivot axis SZ of the second lid 24 runs in the longitudinal direction of the vehicle and on the right on the outside of the lid module 10 or of the central console. Of course, it would also be conceivable for one or both pivot axes SE, SZ to run in the longitudinal direction of the vehicle in a central region of the lid module 10. The two lids 22, 24 which are assigned to the lid module 10 are upholstered on the upper side in order to jointly form an armrest and are separated from each other and matched to each other in the region of a separating gap 26 running in the longitudinal direction of the vehicle approximately in the center of the central console.

Figure 2:
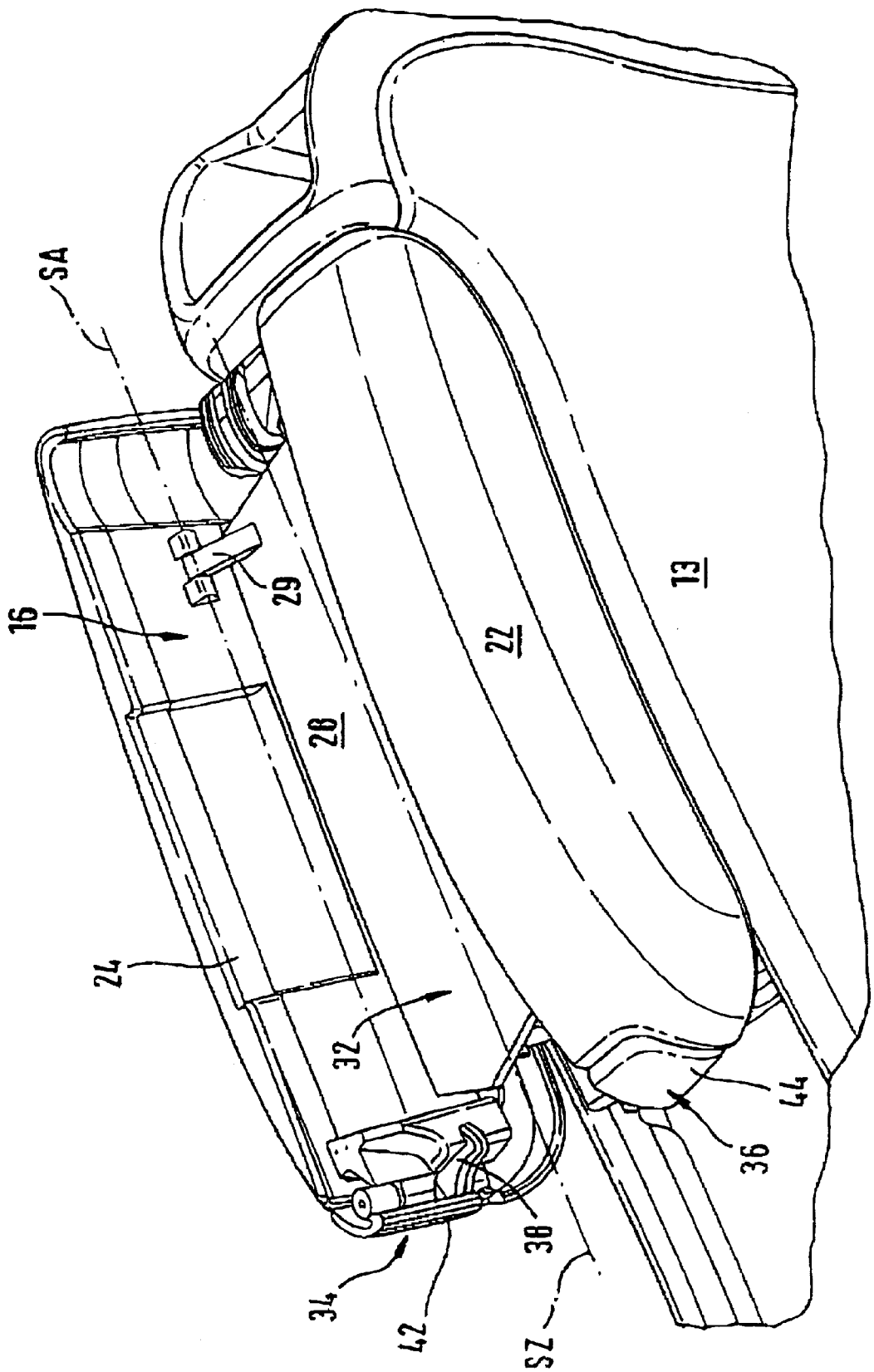
FIG. 2 shows, in a perspective view, the central console according to FIG. 1 with the opened, second lid and a rest which is mounted pivotably on the lower side of the lid and is used to support the telephone device (not illustrated)

FIG. 2 shows, in a partial perspective view laterally and obliquely from the front, the central console according to FIG. 1 with the second lid 24 likewise opened, where, of the telephone device 20, which is accommodated within the upper stowage space 16, only a rest 28 which supports the telephone device is illustrated. The rest 28 is mounted pivotably about a pivot axis SA on the lower side of the second lid 24 by means of a front and rear holding arm 29, of which FIG. 2 only illustrates the rear one. Provided on the upper side 32 of the rest 28 is a holder 30, which can be seen in FIG. 1, for the telephone device 20. The pivot axes SA, SZ of the rest 28 and of the second lid 24 are arranged on the same longitudinal side of the lid 24. In the closed position of the second lid 24 the flat rest 28 is arranged approximately parallel to the lower side of the lid 24. As the lid 24 is pivoted into its open position the rest 28 is pivoted relative to the latter and thereby remains in its approximately horizontal position which is shown. The pivoting movement of the rest 28 can be coupled both to the opening and closing of the lid 24 or can take place manually when the lid 24 has been opened, in which case then a separate locking device for securing the rest 28 to the lower side of the lid 24 can be provided.

The two lids 22, 24 are fixed in their closed position via a respective locking device 34, 36 on the front side and an associated hook part 38 on the lid module 10. Actuation of a respective gripping piece 42, 44 of the associated locking device 34, 36 causes the securing of the corresponding lid 22, 24 to be released and the latter to be transferred from its closed position into its open position. In the closed position the lid module 10 can be secured by means of a locking device (not illustrated) which can be released, for example, by simultaneous actuation of the two gripping pieces 42, 44.

Figure 3:
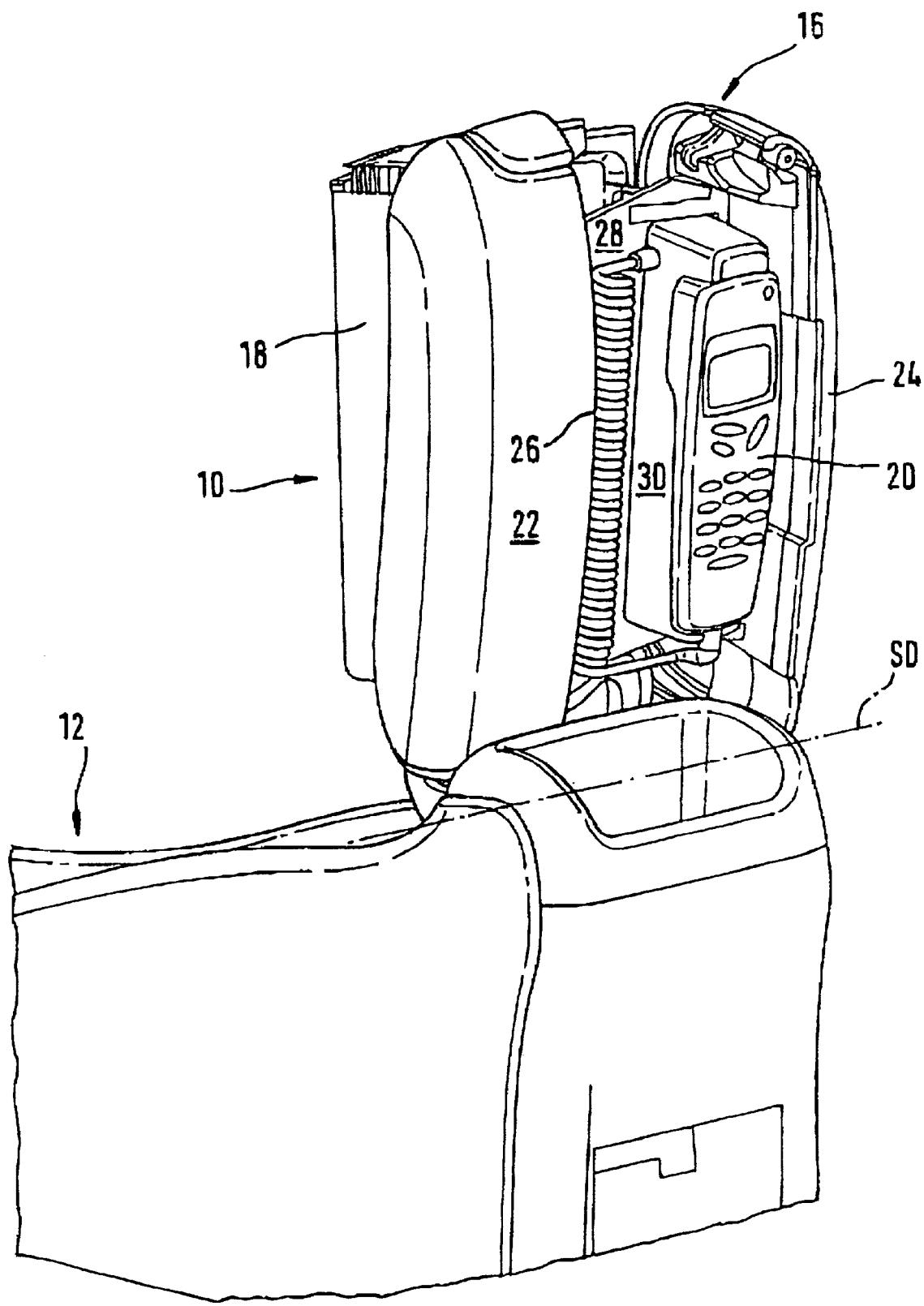
FIG. 3 shows a perspective view of the central console according to FIGS. 1 and 2 with the lid module pivoted into its open position and with an opened, second lid, so that the telephone device is accessible for a rear passenger.

FIG. 3 shows, in a partial perspective view, the central console according to FIGS. 1 and 2, in which the lid module 10 is pivoted from the closed position, which is shown in FIGS. 1 and 2, into its upright open position about a pivot axis SD which is arranged at its rear end and runs in the transverse direction of the vehicle. In this arrangement, the lid module 10 is locked in a latching manner in its upright open position. The second lid 24 is opened here, so that access to the telephone device 20 can be gained in a simple manner for rear passengers. The telephone device 20 is held removably on the holder 30 of the rest 28, for example via magnets (not illustrated) or via a releasable latching connection. The upper stowage compartment 18 is approximately cuboidal and is made of plastic and is adapted in its width and length to the opening cross section of the lower stowage compartment 12. The first lid 22 is shown in FIG. 3 in its closed position.

Figure 4:
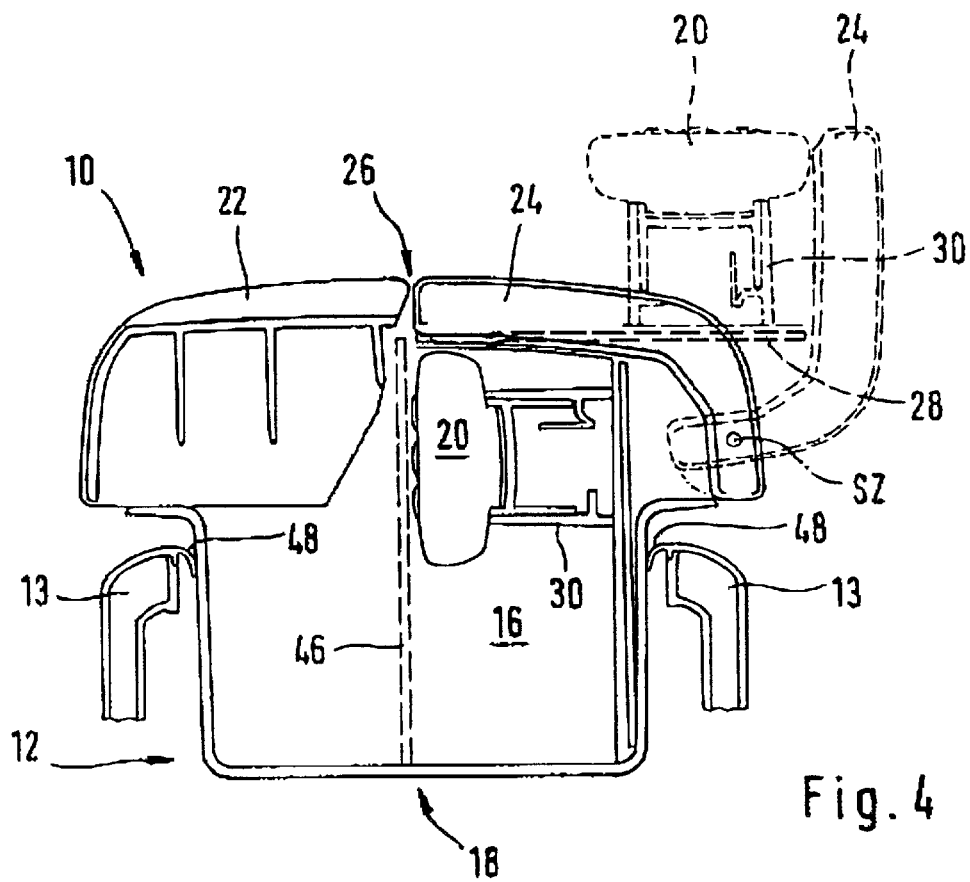
FIG. 4 shows a schematic section in the transverse direction of the vehicle through the lid module of the central console according to FIGS. 1 to 3.

FIG. 4 shows a schematic section in the transverse direction of the vehicle through the lid module 10 which is in the closed position in accordance with FIGS. 1 to 3, in which case the upper stowage compartment 18, which is arranged on the lower side of the lid module 10, projects partially into the lower stowage compartment 12. In this arrangement, only part of the vertical side walls 13 which laterally bound the lower stowage compartment 12 can be seen. Provided between the upper stowage compartment 18 and the opening of the lower stowage compartment 12 is an encircling seal 48, which can be seen at the upper end of the side walls 13 in FIG. 4 and FIG. 5. The right, second lid 24 is shown both in its closed position and in its open position—indicated by dashed lines. It is apparent that the further, upper stowage space 16 is designed as part of the upper stowage compartment 18. In this case, the upper stowage space 16 can be partitioned off from the upper stowage compartment 18 by means of a partition 46—indicated here by dashed lines—which runs vertically and in the longitudinal direction of the vehicle, in which case the telephone device 20 is accommodated within the partitioned-off, upper stowage space 16. The partition 46 may be designed such that it can also be removed. In contrast to the embodiment according to FIGS. 1 to 3, here the rest 28 is not arranged on the lower side of the second lid 24 in a manner such that it can pivot about its axis SA, but rather the flat rest 28 is fastened here to the second lid 24 approximately at right angles to the lower side thereof. Accordingly, when the lid 24 is transferred from the closed position into the open position the telephone device 20 is pivoted through a quarter turn from its lateral position—indicated by solid lines—into its approximately horizontal position of use—indicated by dashed lines. The left region of the upper stowage compartment 18, which region is covered by the closed, first lid 22 and is optionally partitioned off by the partition 46, can be used for holding spectacles or other relatively small items.

Figure 5:
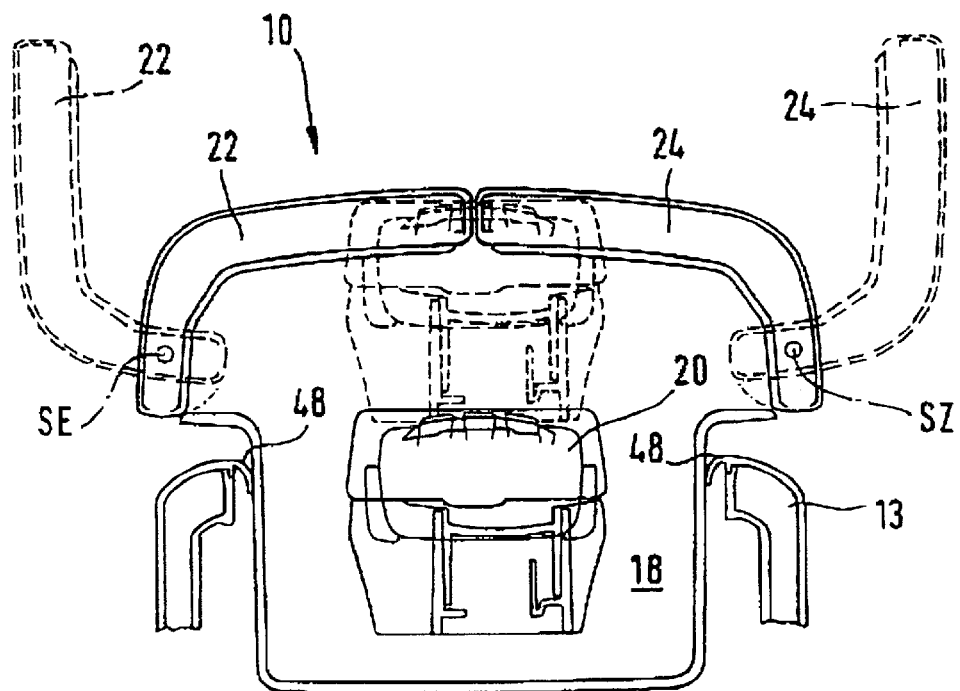
FIG. 5 shows a section in the transverse direction of the vehicle through the lid module of the central console according to a second embodiment of the invention.

FIG. 5 shows a schematic section in the transverse direction of the vehicle through the lid module 10 which is in the closed position in accordance with FIGS. 1 to 3, where, in contrast to FIG. 4, the telephone device 20 here is arranged, as seen in the transverse direction of the vehicle, approximately in the center of the upper stowage compartment 18. In order to gain access to the telephone device 20, in this case the two lids 22, 24 have to be transferred from their closed positions, which are respectively shown by solid lines, into their open positions, indicated by dashed lines. In order to provide a particularly favourable possibility of gaining access to the telephone device 20, the latter can be moved here from a stowed position (shown by solid lines) into a position of use. In this case, the movement of the telephone device 20 can be coupled to the pivoting movement of the lids 22, 24 or else can be carried out separately.

Figure 6:
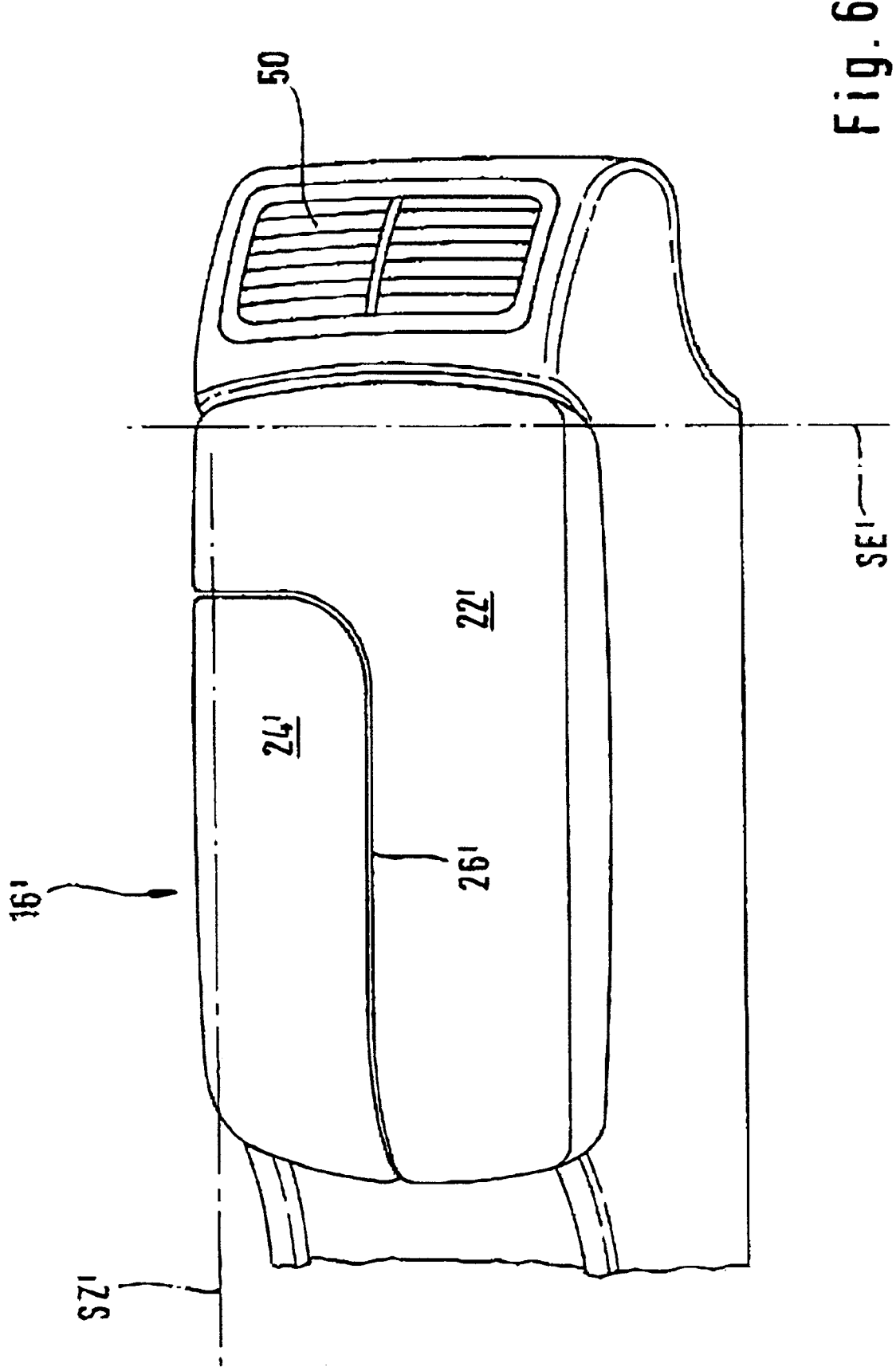
FIG. 6 shows a perspective view laterally from above of the central console according to a third embodiment of the invention with an approximately L-shaped, first lid and a smaller second lid which is matched to the first one.
Figure 7:
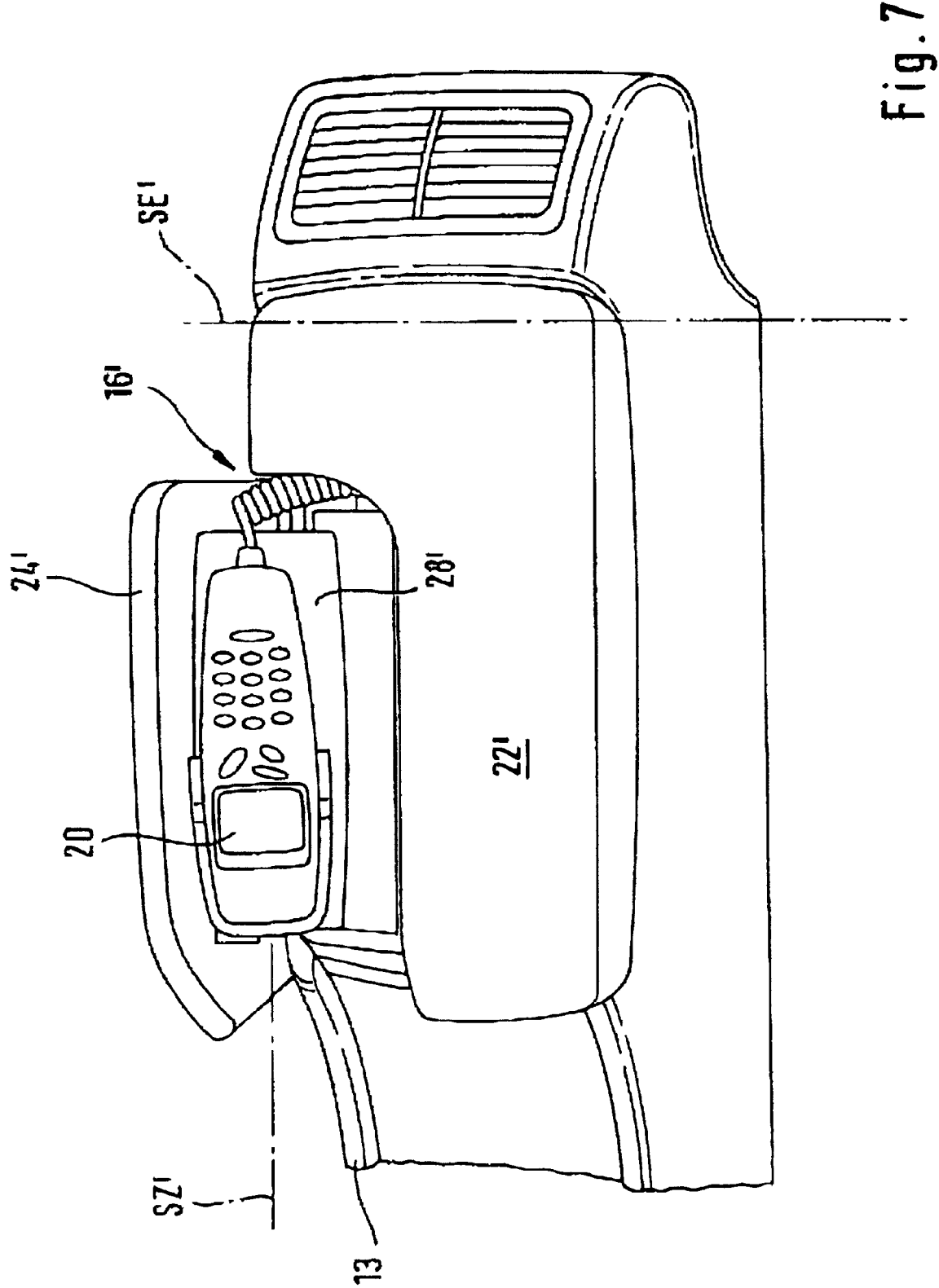
FIG. 7 shows a perspective view laterally from above of the central console according to FIG. 6, in which the second lid has been opened in order to gain access to the telephone device.
Figure 8:
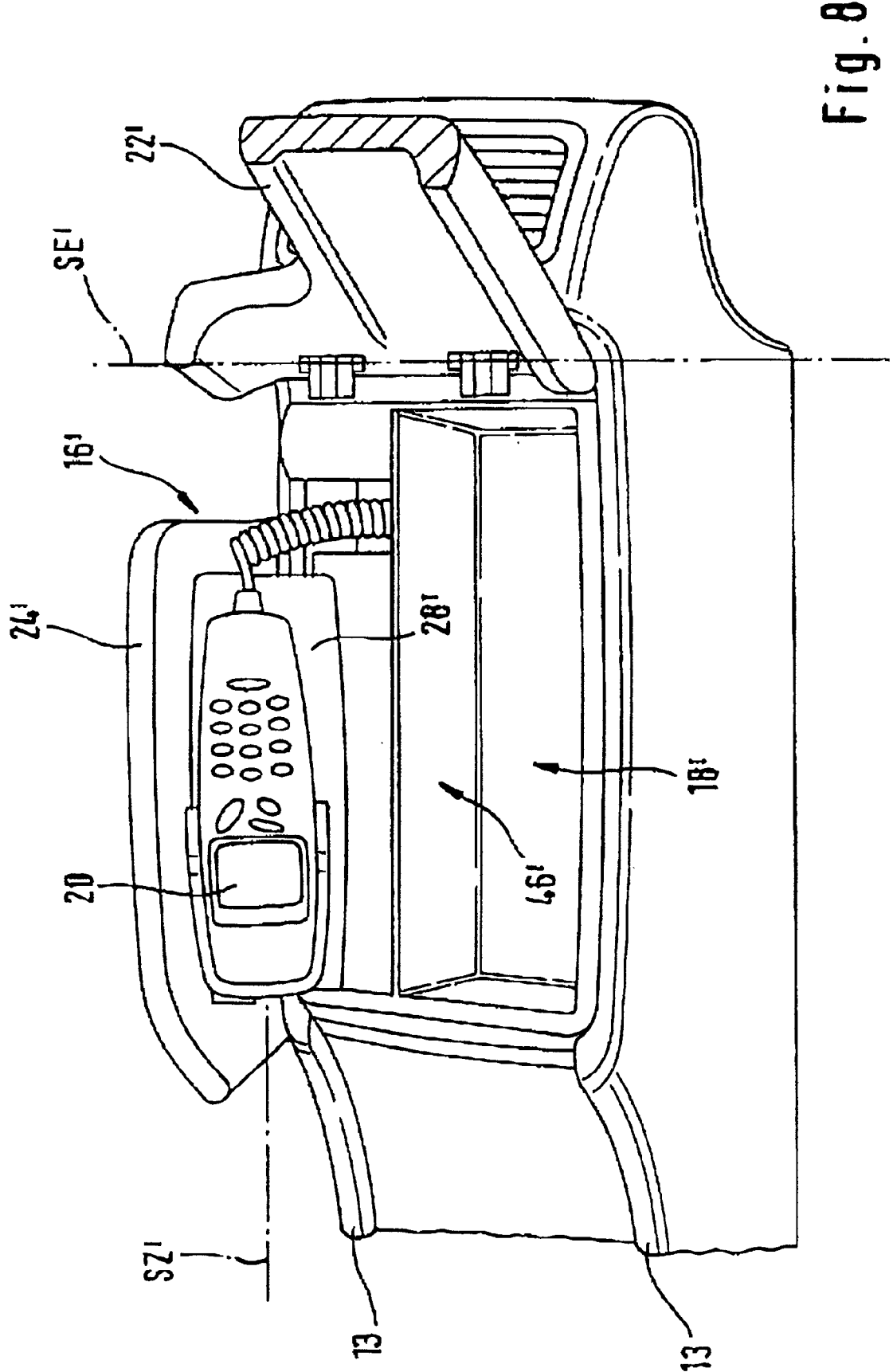
FIG. 8 shows a perspective view laterally from above of the central console according to FIGS. 6 and 7, where in addition to the second lid the first, L-shaped lid has also been opened in order to gain access to the upper stowage compartment.

FIGS. 6 to 11 show a central console according to a third embodiment. In this connection, the lid module 10' which is in its closed position and is arranged in front of an air-distributing opening 50 for the rear compartment can be seen in FIGS. 6 to 8, in each case in a perspective view laterally from above. The telephone device 20 is arranged in turn in an upper stowage space 16' which is designed as part of the upper stowage compartment 18'. The stowage compartment 18' together with the stowage space 16' is covered by an approximately L-shaped first lid 22' and a smaller, second lid 24' of the stowage space 16', which lids are matched to each other in the region of an L-shaped separating gap 26'. In order to gain access to the telephone device 20, the second lid 24' can be transferred from its closed position into the open position again about a pivot axis SZ' running in the longitudinal direction of the vehicle and on the outside of the central console. A rest 28', which is designed in the manner of the rest 28 described according to FIG. 2 and is therefore not explained in greater detail, is mounted pivotably on the lower side of the second lid 24' for the purpose of holding the telephone device 20. The L-shaped lid 22' can be pivoted between its closed position, which is shown in FIGS. 6 and 7, and its open position, which can be seen in FIG. 8, about a pivot axis SE' which runs in the transverse direction of the vehicle and is arranged at its rear end. In one particular embodiment, the axes of the first lid 22' and of the lid module 10 run coaxially with each other. The upper stowage space 16' is partitioned off here from the upper stowage compartment 18' by means of a partition 46' which runs vertically and in the longitudinal direction of the vehicle, in which case the partitioned-off, left region of the stowage be compartment 18' can be used for storing relatively small objects. Of course, the omission or a profile of the partition 46' which is L-shaped in plan view and lies overlapping the separating gap 26' would also be possible.

Figure 9:
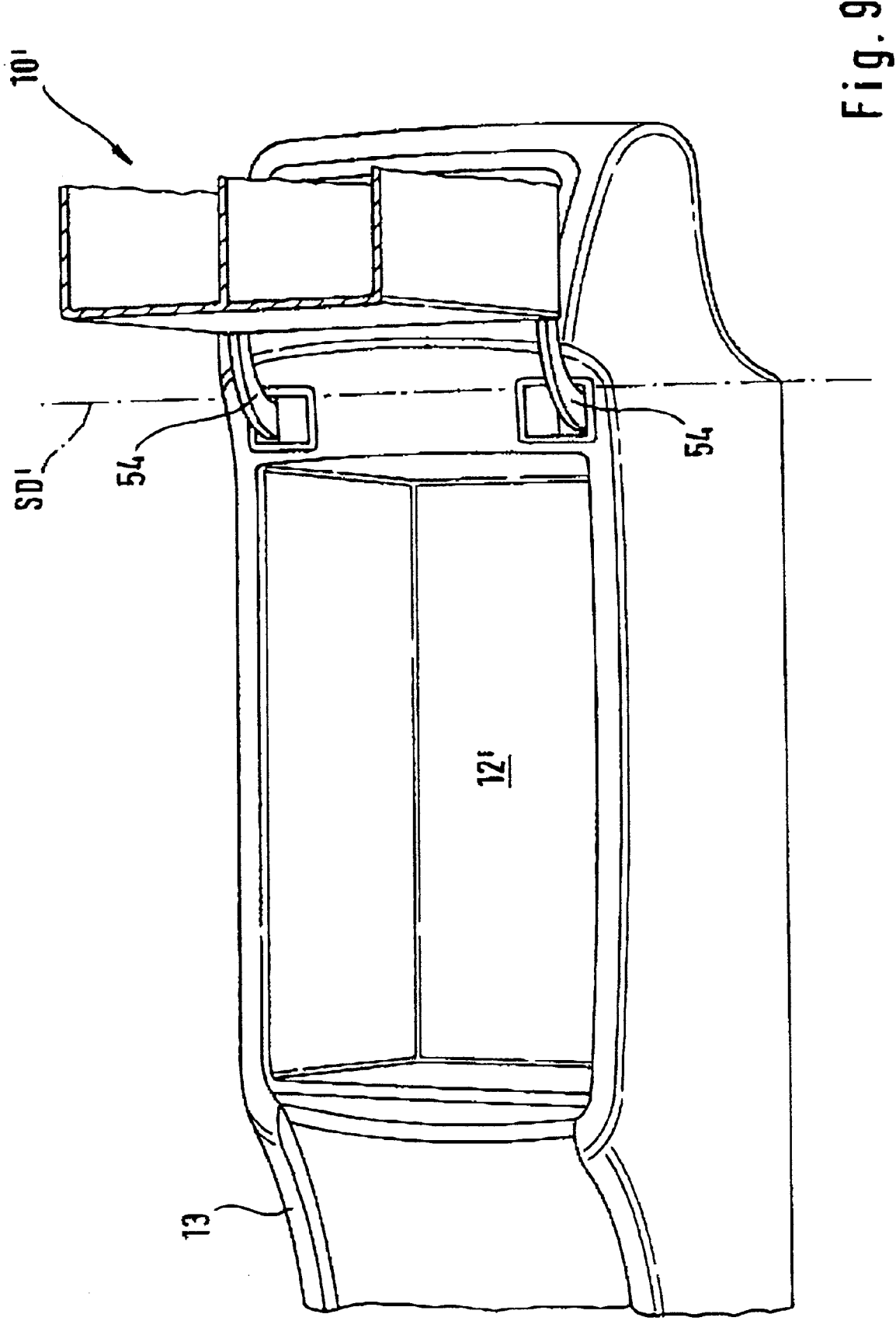
FIG. 9 shows a perspective view from above of the central console according to FIGS. 6 to 8, in which the entire lid module has been brought into its upright open position in order to gain access to the lower stowage compartment.
Figure 10:
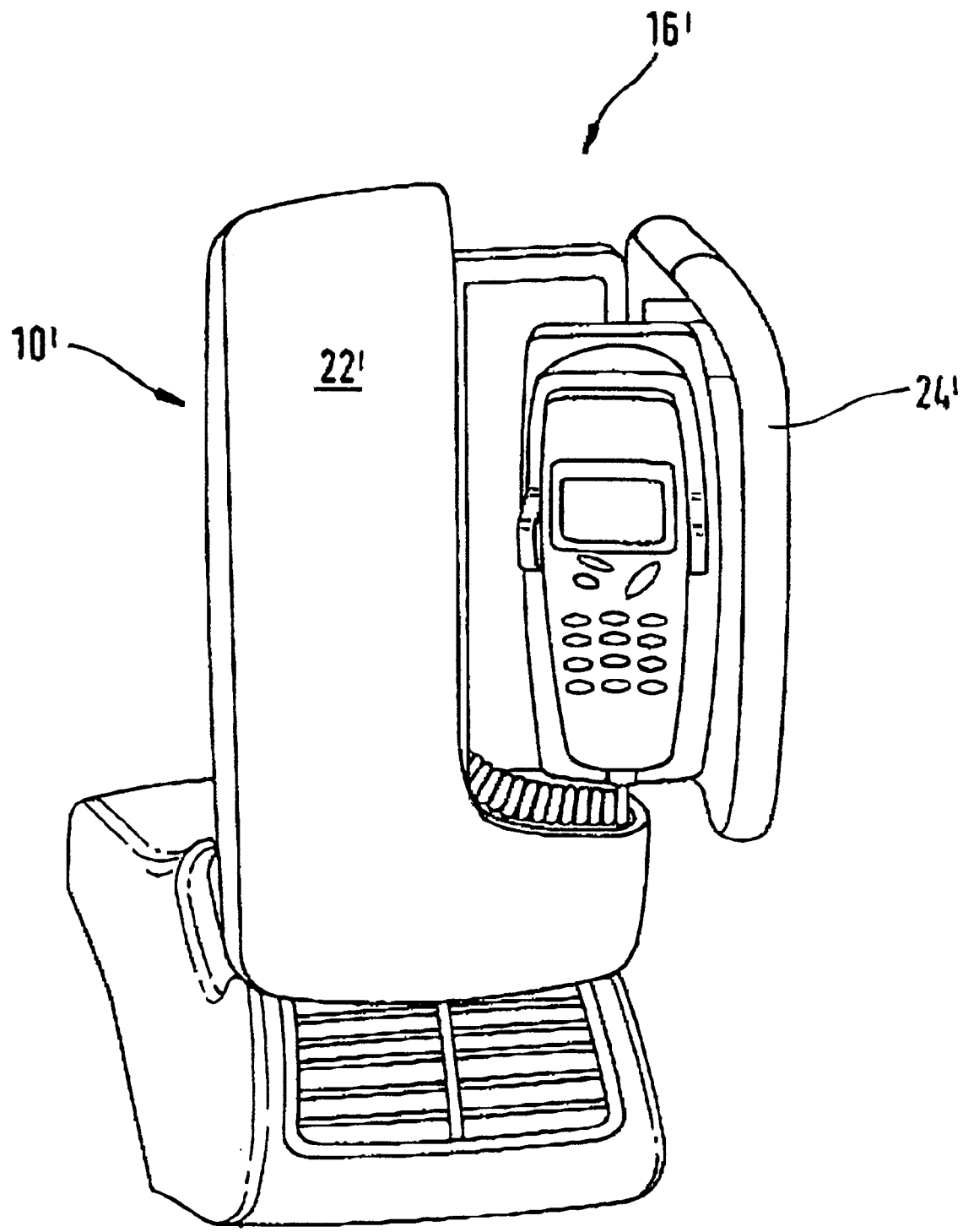
FIG. 10 shows a perspective view from the rear of the central console according to FIGS. 6 to 9 with the lid module brought into its open position, where the second lid has been opened in order to gain access to the telephone device for a rear passenger.

FIG. 9 shows the central console in a perspective plan view, where the lid module 10', indicated schematically just in the region of hinge arms 54 of its pivot axis SD', is pivoted into its upright open position in order to gain access to the lower stowage compartment 12. The pivot axis SD' runs in the transverse direction of the vehicle at the rear end of the lid module 10'. The lid module 10' is again locked in a latching manner in its upright open position. The lower stowage compartment 12 is of approximately cuboidal design and is suitable for accommodating relatively large objects. FIG. 10 shows, in a perspective view from the rear, the lid module 10' which is pivoted into its open position in accordance with FIG. 9 together with an opened, second lid 24' so that the telephone device 20 can also be used here in a simple manner for rear passengers.

Figure 11:
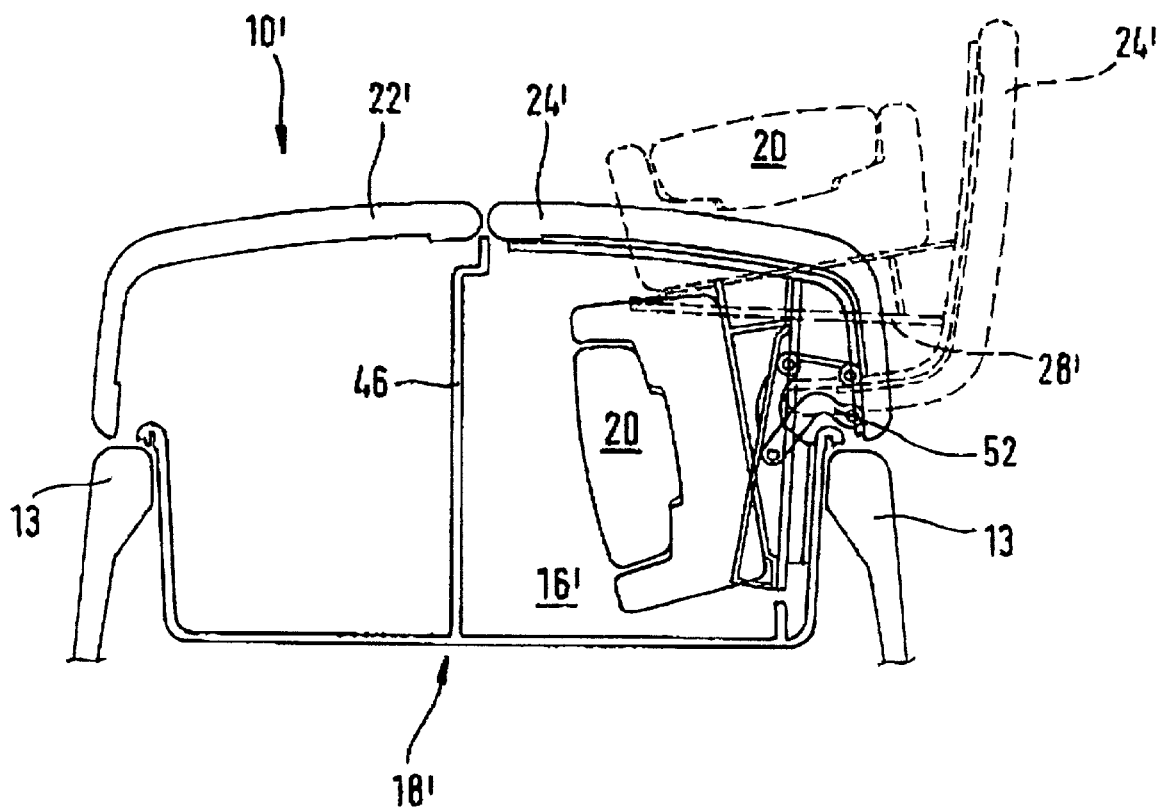
FIG. 11 shows a section in the transverse direction of the vehicle through the lid module of the central console according to FIGS. 6 to 10.

Finally, FIG. 11 shows a schematic section in the transverse direction of the vehicle through the lid module 10' which is in the closed position in accordance with FIGS. 6 to 10. The closed position of the second lid 24' and the stowed position of the telephone device 20 are illustrated by solid lines, and the open position of the second lid 24' and the position of use of the telephone device 20 are indicated by dashed lines. In this case, the movement of the rest 28' of the telephone device 20 is coupled via linkage levers 52 to the pivoting movement of the lid 24' so that when the lid 24' is opened, the telephone device 20 is transferred from the lateral, stowed position into the position of use.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Central console in a motor vehicle interior, comprising:
    a lower stowage compartment which can be closed by a lid module and is bounded laterally by side walls, said lid module being pivotal about a pivot axis which is arranged at its rear end and runs in the transverse direction of a vehicle,
    an upper stowage compartment which is arranged on a lower side of the lid module for accommodating a telephone device or other items and is covered by a first lid forming part of an armrest, and
    a further upper stowage space which is covered by a second lid which is designed as a further part of the armrest and can be pivoted about a pivot axis,
    wherein the further upper stowage space is designed as part of the upper stowage compartment and together with the second lid is assigned to the lid module in such a manner that they can be pivoted together with the lid module.

2. Central console according to claim 1, wherein the further upper stowage space is partitioned off from the upper stowage compartment and the telephone device is accommodated within the partitioned-off, further upper stowage space.

3. Central console according to claim 1, wherein the telephone device is arranged on the lower side of the second lid.

4. Central console according to claim 3, wherein a rest for the telephone device is pivotably mounted on the lower side of the second lid, in which case the pivot axes of the second lid and of the rest are arranged on the same longitudinal side of the lid.

5. Central console according to claim 1, wherein the telephone device is accommodated approximately in the center of the upper stowage compartment and can be moved from a lower rest position into an upper operational position.

6. Central console according to claim 1, wherein the lid module can be locked in its upright open position.

7. Central console according to claim 1, wherein the first lid can be pivoted between its closed position and its open position about a pivot axis running in the longitudinal direction of the vehicle.

8. Central console according to claim 7, wherein the pivot axes of the first and second lids run along the respectively assigned, outer longitudinal side of the lids.

9. A central console assembly for a passenger vehicle, comprising:
    a lower stowage compartment, and
    a lid module movable between a covering position covering the lower stowage compartment and an open position uncovering the lower stowage compartment, said lid module including:

a first upper stowage space disposed on a lower side of the lid module, said first upper stowage space being configured to stow a telephone, a first lid covering the first upper stowage space and forming part of an armrest, a second upper stowage space disposed laterally of the first upper stowage space, and a second lid covering the second upper stowage space, wherein said lid module including said first and second upper stowage spaces being movable together between said lid module covering position and uncovering position.

10. A center console assembly according to claim 9, wherein said lid module is mounted for pivotal movement about a pivot axis at one end of the lid module.

11. A center console assembly according to claim 9, wherein said lid module is mounted for pivotal movement about a pivot axis at a rear end of the lid module.

12. A center console assembly according to claim 9, comprising side walls bounding the lower stowage compartment and extending in use in a longitudinal driving direction of the vehicle, wherein said lid module is mounted at said side walls for pivotal movement about a transversely extending pivot axis at one end of the lid module.

13. A center console assembly according to claim 9, comprising side walls bounding the lower stowage compartment and extending in use in a longitudinal driving direction of the vehicle, wherein said lid module is mounted at said side walls for pivotal movement about a transversely extending pivot axis at a rear end of the lid module.

14. A center console assembly according to claim 9, wherein said first and second lids are pivotally mounted at respective longitudinally extending axes.

15. A center console assembly according to claim 10, wherein said first and second lids are pivotally mounted at respective longitudinally extending axes.

16. A center console assembly according to claim 11, wherein said first and second lids are pivotally mounted at respective longitudinally extending axes.

17. A center console assembly according to claim 12, wherein said first and second lids are pivotally mounted at respective longitudinally extending axes.

18. A center console assembly according to claim 13, wherein said first and second lids are pivotally mounted at respective longitudinally extending axes.

19. A passenger vehicle having front and rear passenger seats and a center console assembly disposed between two of said front seats, said center console assembly comprising:

a lower stowage compartment, and a lid module movable between a covering position covering the lower stowage compartment and an open position uncovering the lower stowage compartment, said lid module including:

a first upper stowage space disposed on a lower side of the lid module, said first upper stowage space being configured to stow a telephone, a first lid covering the first upper stowage space and forming part of an armrest, a second upper stowage space disposed laterally of the first stowage space, and a second lid covering the second upper stowage space, wherein said lid module including said first and second upper stowage spaces being movable together between said lid module covering position and uncovering position.

20. A passenger vehicle according to claim 19, wherein said lid module is mounted for pivotal movement about a pivot axis at a rear end of the lid module.

21. A passenger vehicle according to claim 19, comprising side walls bounding the lower stowage compartment and extending in use in a longitudinal driving direction of the vehicle, wherein said lid module is mounted at said side walls for pivotal movement about a transversely extending pivot axis at a rear end of the lid module.

22. A passenger vehicle according to claim 19, wherein said first and second lids are pivotally mounted at respective longitudinally extending axes.

23. A passenger vehicle according to claim 22, wherein said center console includes an air conditioning outlet at a rear end thereof behind the lid module.

* * * * *